Feb. 29, 1944.  A. C. HOLM ET AL  2,343,185
ACETYLENE GENERATION
Filed March 16, 1942
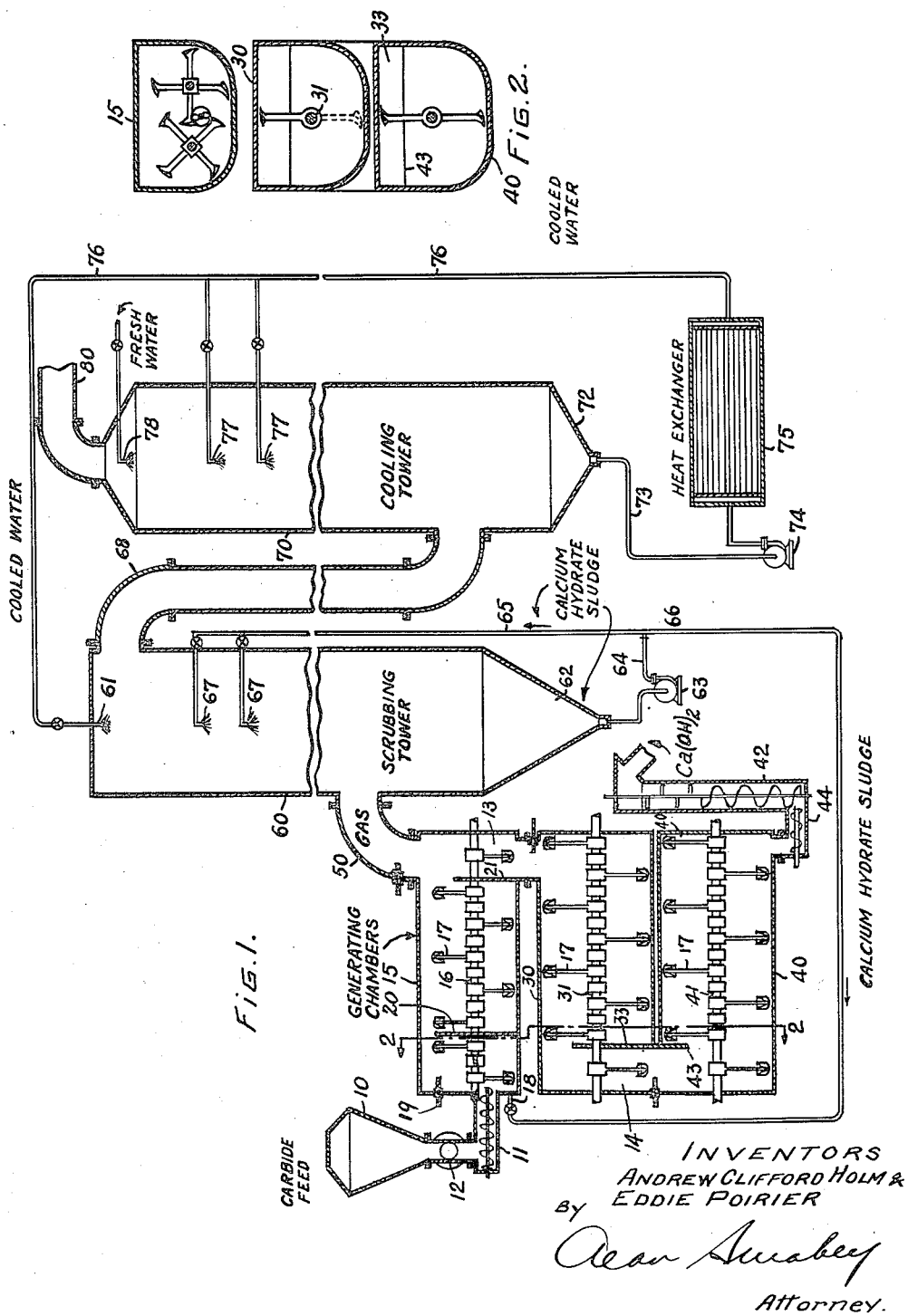
INVENTORS
ANDREW CLIFFORD HOLM &
EDDIE POIRIER
BY
Alan Awabery
Attorney.

Patented Feb. 29, 1944

2,343,185

UNITED STATES PATENT OFFICE 2,343,185

ACETYLENE GENERATION

Andrew Clifford Holm and Eddie Poirier, Shawinigan Falls, Quebec, Canada, assignors to Shawinigan Chemicals Limited, Montreal, Quebec, Canada, a corporation of Canada Application March 16, 1942, Serial No. 434,942
In Canada October 21, 1941

23 Claims. (Cl. 48—38)

INTRODUCTION

This invention relates to a continuous and simultaneous process for producing acetylene gas and dry lime hydrate by reacting calcium carbide and water.

OBJECTS

Principal objects of the invention are to provide a process for the simultaneous production of acetylene gas of low organic sulphur content and substantially dry lime hydrate free of unreacted carbide.

A further object of the invention is to provide in a process of this kind means for a high rate of production of acetylene gas and lime hydrate.

A further object of the invention is to provide for the accomplishment of these principal objects a process which is economical, simple and easily controlled.

It is a further object of this invention to provide in a process of this kind means for the scrubbing and cooling of the acetylene gas which will avoid any loss of acetylene and lime hydrate.

It is a still further object of this invention to provide means for carrying out the reaction between calcium carbide and water in the presence of water in controlled excess over that required to react completely with the carbide.

THE PRIOR ART

The chemical equation for the reaction between calcium carbide and water to produce acetylene and lime hydrate is:

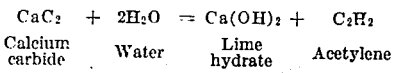

$$CaC_2 + 2H_2O = Ca(OH)_2 + C_2H_2$$
Calcium carbide — Water — Lime hydrate — Acetylene

Wet generation

Until recently, this reaction has been carried out industrially by what is known as "wet" generation. Calcium carbide is dropped into a very large excess of water, thoroughly stirred, the evolved acetylene gas piped from the machine for subsequent treatment, while the resultant slurry, consisting of finely-divided lime hydrate suspended in water, is discharged to a river or suitable sludge pond.

This "wet" process has the great advantage that the reaction is both rapid and complete, the large excess of water ensuring complete slaking of the carbide at a uniformly high rate. The large amount of heat liberated is readily taken up by the water, so that the gas is evolved at relatively low temperatures, which is conducive to the production of high-purity gas.

These features of the "wet" generation process, namely the rapid and complete slaking of the carbide and the production of gas of good quality, are most desirable advantages, but they are more than counterbalanced by the great disadvantage of the process, which is usually the waste of all the lime hydrate produced. One pound of carbide reacting with water produces about 1.16 pounds of lime hydrate and theoretically it should be possible to recover all this lime hydrate and return it to the carbide process, where, combining with carbon, it would again produce one pound of carbide. In such a case there would be no necessity for introducing fresh calcium in the form of lime or limestone into the cycle. Apart from its possible re-use in the carbide process, this lime hydrate could also find other commercial applications, such as for neutralizing and causticizing, and it is therefore a valuable by-product of acetylene generation. In the wet generation process, however, this lime hydrate is so finely dispersed in such a large volume of water that it has proven economically infeasible to recover it, and it is all discharged to waste.

It has also been suggested that the wet sludge from wet generators may be recovered by removing the sludge from the bottom of the machine below the surface of the water and drying up the sludge by the addition of more carbide. It has also been proposed to remove the sludge before all the carbide has been reacted and permitting the unreacted carbide to take up the excess water from the sludge. Neither of these suggestions has been commercially practical; the first involves a two-step process with two carbide feeds rendering control exceedingly difficult while the second is economically infeasible.

The difficulty with processes of this kind is that no provision has been suggested for the violent agitation of the type necessary for the complete reaction of the unreacted carbide in the hydrate. Furthermore, these processes have never reached commercial-scale operation on account of the impossibility of expanding the equipment beyond the pilot plant unit. A multiplicity of small units would be impracticable and uneconomic. The control of these processes is also extremely difficult unless a secondary carbide feed is inserted. This again involves other mechanical complications, the solution of which has not yet been suggested.

Dry generation

As a result, "dry" generating processes have been developed in which water in limited amounts only is sprayed, dripped or otherwise added to calcium carbide. The addition of water is so regulated as to obtain the lime hydrate residue directly in the form of a substantially dry powder, in which form it can be re-used or sold commercially. Because of this recovery of lime hydrate and the resultant economic advantage, the dry generation process has in many instances supplanted the wet process.

In the operation of the dry process, however, certain disadvantages have appeared. One of these is the difficulty of achieving complete reaction of the carbide. When only a limited quantity of water is added to carbide, a coating or dry lime hydrate tends to form on the surface of the individual pieces. This coating impedes the penetration of water to the carbide in the interior, greatly reducing the rate of generation of gas. As a result, unreacted pieces of carbide may be found in the lime hydrate produced. This occurrence is a serious hazard, as upon storage of the hydrate in containers or tanks, the unslaked carbide may slowly react with the residual moisture in the hydrate evolving acetylene gas which may cause explosions. To leave the hydrate containing unreacted carbide in the generator long enough to complete the reaction would reduce the output to an impractically low figure, or necessitate building a machine of excessive size.

A further disadvantage of the dry generation process is the formation of organic sulphur compounds, particularly when using carbide of high sulphur content. When water is added to carbide in limited amounts, the reacting mass of carbide, water and lime hydrate assumes a higher temperature than it does if a considerable excess of water is present, and there is the further possibility of localized overheating occuring within the mass. The higher temperature favours the formation of organic sulphur compounds such as divinylsulphide, and the higher the temperature, the more of these bodies are formed. Dry-generated acetylene gas may thus contain a great deal more organic sulphur, an undesirable impurity, than wet-generated gas.

Various modifications

To overcome the difficulty of unreacted carbide in the hydrate, it has been proposed to bring about a separation of the carbide and lime hydrate in various ways, the carbide being retained for further treatment while the substantially dry lime hydrate powder is discharged. Among the methods proposed to achieve this classification are screening of the carbide-lime hydrate mixture; removal of the hydrate powder by a stream of acetylene of high velocity; and gravitational separation of the carbide from the lighter hydrate powder. All of these methods have certain disadvantages, for instance in the commercial operation of the last-named method it has been found that the capacity of the generator is low, the carbide size limited to the smallest screen sizes, and the possible operating range in regard to the proportion of carbide and water being fed is so narrow as to make operation very difficult.

In this type of generator the carbide and water are fed in at lower portions of a vertical reaction chamber fitted with an agitator consisting of two sets of paddles mounted on one and the same vertical axis and rotating in opposite directions. The lighter hydrate is carried up to the top of this chamber to an outlet by the action of the paddles, by the gas rising up through the mass and by displacement by the incoming carbide, while the heavier carbide particles fall back towards the bottom of the chamber where they are further slaked. The successful operation of this process depends on keeping the entire reaction mass in a dry, fluid, free-flowing condition at all times, so that the introduction of the carbide displaces the dry hydrate vertically. If the water input is too low, and the moisture in the hydrate produced drops to 1% or less, carbide will appear in the product and if this condition is allowed to continue, carbide lumps may even accumulate in the bottom of the reaction chamber to such an extent as to stall the agitators. On the other hand, if the water input is too high, and the moisture in the hydrate rises to 4 or 5% and higher, the gravitational classification fails because the damp hydrate carries out of the reaction chamber with it lumps of unreacted carbide and this damp hydrate may even cause the agitators to stall. Such a narrow range of moisture content of the hydrate is extremely difficult to maintain in practice because of unforseen changes in the weight of carbide being fed to the generator due to variations in screen size, purity or grade of the carbide and the difficulties of uniformly feeding fine-sized carbide into a generator which is under gas pressure.

In another proposed method for completely slaking the unreacted carbide in the lime hydrate, the mixture of carbide and lime hydrate is moved in a horizontal direction through a plurality of chambers under constant agitation while water in limited amounts is dripped, sprayed or otherwise added to the mixture at numerous points all along its path of travel. The success of this method depends on providing a path of sufficient length to permit all the carbide being slaked, the mass being kept in a substantially dry condition throughout. As in the previously discussed method, this process requires close control of the water input and the generator has a low output in proportion to its volume. The process has the further disadvantage of producing gas of high organic sulphur content. This is due to the higher temperatures that prevail in the reacting mass throughout the generator as the result of insufficient water being present to adequately absorb the heat of reaction, the water being added in small amounts only at various points along the path of travel in a manner to avoid contact of generated gas and water so that the carbide is always in excess except near the discharge end of the generator. The resulting gas may contain from 10 to 50 grams of organic sulphur per 1,000 cu. ft., whereas gas generated by the wet process contains about 1 gram per 1,000 cu. ft.

From the foregoing it is evident that none of the heretofore proposed processes or machines for the dry generation of acetylene have proven entirely satisfactory in practice. Difficulties have arisen due to unslaked carbide remaining in the hydrate, the occurrence of organic sulphur compounds in the gas, low generating capacity of the apparatus or too narrow an operating range in regard to the proportions of carbide and water.

Difficulties in purifying

A further difficulty has arisen in the cooling and scrubbing of the acetylene gas produced. The gas leaving the generator at a temperature of about 200° F. contains about 4 cu. ft. of steam for each cu. ft. of acetylene and carries in suspension considerable lime hydrate dust. In scrubbing out this lime hydrate dust and condensing the steam, waste liquors are obtained which are generally discharged to a sewer or sludge pond. This entails an appreciable loss of lime hydrate and of the acetylene dissolved in the liquors, this acetylene in addition presenting an explosion hazard in the sewers. It would be of definite advantage to eliminate this discharge of waste liquors in the dry generation process.

THE PRESENT PROCESS

Generation

The present process is especially designed to overcome the previously discussed disadvantages of the generating processes at present in use. By the present invention, there is provided a method for producing acetylene of low organic sulphur content and lime hydrate free of unreacted carbide and of controlled moisture content. The process is simple and economical to operate and has a relatively high capacity. By a refinement of this process, the waste liquor resulting from the scrubbing and cooling of the acetylene gas is recovered and used in place of fresh water for the slaking of the carbide in the generator, thus avoiding all loss of hydrate and acetylene and creating certain beneficial effects in the generation process itself, as will be described.

In the present invention carbide and water are added to a generating zone of limited volume in such proportions that the water is at all times in "controlled excess" of that required for complete reaction to form acetylene and lime hydrate. The term "controlled excess" is used to define an amount of water, at a stage of the process, which is more than effective to react completely the carbide present at that stage and to absorb the heat of reaction, and which is at the same time an amount effective to keep the moisture content of the hydrate discharged from the process to within predetermined limits. All of the water to be used in the generation process is preferably added to the carbide in a first zone, in which case a controlled excess obtains at all stages in the process. The contents of the first zone or chamber are agitated violently by means of two sets of paddles mounted on two parallel horizontal shafts, the unslaked carbide reacting with the incoming water immediately, these materials and the resulting lime hydrate being thoroughly intermingled to evolve acetylene gas at a very rapid rate. The baffling effect of a dam causes the contents of the chamber to assume and maintain a predetermined depth, and prevents the mixing of the contents of the first zone with those of the subsequent ones. As the water is in controlled excess of that required for complete reaction and has all been added initially, a wet, pasty mass results, containing pieces of unslaked carbide which have been stirred into it by the action of the agitators. Then, this wet mass of lime hydrate containing a small quantity of unreacted carbide, while still being thoroughly agitated and evolving gas rapidly, is forced progressively and continuously by the action of the agitators in a substantially horizontal direction across the top of the dam into a subsequent chamber before all the carbide contained in the mixture has had time to react. In this second chamber and in succeeding ones through which the mass moves in a substantially horizontal direction the violent agitation is continued by means of paddles mounted on horizontal shafts. The carbide remaining in the mass leaving the first chamber quickly reacts with excess water present in the lime hydrate, and the mass gradually becomes drier and free-flowing as this excess water is removed by reaction with carbide and by evaporation as steam by the heat of reaction between the carbide and the water. By means of dams placed at suitable points in these chambers, the mixing action is improved as the mass is baffled in its horizontal movement and thus retained in the various zones of the apparatus for sufficient time to allow all of the residual carbide to be completely reacted and the lime hydrate discharged from the apparatus to be of uniform moisture content throughout.

In the present process then, the greater portion of the carbide is slaked in the presence of the excess water fed into the generating chamber formed by the first dam. Since the water is always in a ratio of excess to the unreacted carbide (not to the total mass of carbide+hydrate) the water ratio of total solids will be very much greater at the outset than subsequently. Later as the ratio of unreacted carbide to the total mass becomes much less, the water content also decreases proportionately, and there will at the same time be a maximum ratio of liquid water to total solids at all zones in the process. In the first chamber, therefore, when the water ratio is at its highest, conditions approach those of a wet generator. This being the case, there is obtained rapid slaking of the carbide resulting in a gas of low organic sulphur content. By maintaining the whole mass in the first generating chamber in a wet condition, the lumps of carbide are prevented from becoming coated with dry lime hydrate, as might occur in the ordinary dry generation process where a limited quantity of water is sprayed, dripped or otherwise added to the carbide. Such a coating, if formed, would retard or prevent the penetration of water to the carbide in the interior of the lump. In the continuous presence of a controlled excess of water, however, the reaction can go rapidly and uniformly forward. Because of the high rate of generation thus obtained, a dry generator operating on this principle of controlled excess will have a higher output than one of the same size operating according to prior art concepts. Even when this type of generator is operated near its upper production limits, there is little danger of unreacted carbide appearing in the lime hydrate. The controlled excess of water also reduces the temperature within the generator, thus reducing the tendency for organic sulphur impurities to form.

The applicants' principle of generator also retains the inherent advantage of producing dry lime hydrate of controlled moisture content and thus of high commercial value. This is admirably and simply accomplished in the preferred form of apparatus to be described.

Moreover, the formation of a wet, heavy and sticky mass of lime hydrate containing pieces of unreacted carbide such as is produced in the first reaction chamber of the described generator is deliberately and scrupulously avoided in other dry generation processes, partly because the principle depends on maintaining a substantially dry, fluid, free-flowing mass, and partly because the agitators and driving mechanism are not designed to handle such a material and would be stalled if it formed in any quantity. It is, therefore, imperative in these dry generators that the water be strictly controlled in a certain definite proportion to the carbide input, and the permissible variation from this fixed ratio is very small on either the wet or the dry side, e. g., in one type of dry generator at present in use, the moisture in the lime hydrate must be kept between about 2% and 5%. Such a narrow operating range is difficult to maintain in actual practice and in consequence the operation of the generator is easily and frequently upset. In the present invention, however, the possible operating range is much greater. By proper design of the agitators, by distributing the load on two shafts and making these as short as possible, and by confining the water input to a single chamber and making this chamber as small as possible, the generator has been enabled to handle the very wet, heavy mass which results from the deliberate use of excess water in the process. There is therefore less danger of a temporary over-supply of water leading to mechanical difficulties in this type of generator.

In experimental work this generator has, in fact, operated successfully producing hydrate containing as much as 14% moisture. If a deficiency of water occurs and is not corrected, the same difficulties are experienced with the lime hydrate gas-seals and unreacted carbide in the hydrate as in the ordinary dry generator, but there is little danger of stalling the agitators. Moreover, such a deficiency of water is immediately made apparent by rising temperature in the reaction chamber, and can be corrected in the subsequent conditioning chambers by adding the required amounts of water, provision being made in these chambers for water addition in just such an emergency. In this generator, as in other types, it is desirable to keep the ratio between the water and the carbide input within certain fixed limits in order to obtain the best results.

Purifying the acetylene—Recirculation

According to a refinement of this generating process, the generated acetylene gas, containing a great deal of steam and lime hydrate dust in suspension, is scrubbed and cooled by means of a circulatory system which recovers all the lime hydrate and water in the gas and returns these to the process. As a result, there is absolutely no loss of acetylene or lime hydrate which is an advantage over other dry generation processes at present in use where the loss from the scrubbing and cooling operations may be considerable. In these latter processes, also, the acetylene contained in the waste liquors creates an explosion hazard in the sewers, sumps and the like, which is eliminated by the circulatory system.

Apart from these advantages of elimination of waste and explosion hazards, the application of the circulatory scrubbing and cooling system to the described generating process is further beneficial in that it permits a larger excess of water to be used in the reaction chamber of the generator. In this system a sludge is recovered consisting of lime hydrate suspended in hot water, and this sludge is pumped in part to the "wet" reaction chamber of the generator at a temperature of about 185° F. This hot sludge is used in whole or in part for the slaking of the carbide, replacing the cold fresh water that is commonly used for this purpose, the preferred method of operation being to use hot sludge exclusively. In reacting with water, one pound of carbide liberates almost 800 B. t. u.'s of heat. This heat is dissipated in heating up the reactants and products and in volatilizing as steam a certain amount of the added water. If now the incoming water is already hot, less heat is needed to raise its temperature to the volatilization point and this heat is available instead for volatilizing further water. By using hot water or sludge in the generator, it becomes possible to add over 12% more water to the reacting mass, without increasing the moisture content of the discharged hydrate, than can be done when using cold water, this extra water being evaporated off as steam. In the dry generators at present in use, the addition of 12% extra water above that normally used would result in the generator becoming inoperable due to the wetting of the lime hydrate. The presence of this extra water in the reaction chamber is beneficial both in speeding up the slaking of the carbide and in reducing the formation of organic sulphur compounds. The presence of the resulting extra steam in the gas has also a beneficial effect in that, by reducing the temperature of the gas and diluting it, undesirable reactions of the gas in the generating chamber are impeded.

Detailed description

The invention will now be described in greater detail by reference to the accompanying drawing. Then, a general description will be given of the structural features of the preferred form of apparatus shown followed by a description of the operation of this apparatus carrying out the applicants' process under preferred conditions, with a brief discussion of the advantages of this process over those at present in use.

Figure 1 is a diagrammatic elevation partly in section of the preferred form of apparatus.

Figure 2 is a fragmentary cross section along the line 2—2 of Figure 1.

General arrangement

As shown in the drawing, the apparatus consists of a feeding mechanism for the starting materials—carbide and water; a generating unit including a series of acetylene generating chambers; discharge means for removing the reaction products—acetylene and lime hydrate; a scrubbing unit for removing impurities from the acetylene; a cooling unit for the acetylene; a heat exchanger for lowering the temperature of the water circulating from the cooling unit; and a piping system for connecting up the various parts of the apparatus.

Feeding and generating apparatus

The feeding apparatus consists of a feed hopper 10 connected to a screw feed 11 and provided with a suitable valve 12 to close off the hopper from the generator. The feed 11 is provided with a variable speed drive. The feed 11 enters the top drum 15 of the generating unit. This drum has a rounded bottom and a flat top and is fitted with two parallel horizontal shafts 16 on which are mounted agitator paddles 17. The shafts 16 are suitably driven so as to be capable of operation under a heavy load. The drum 15 is divided into two sections or chambers by a dam 20. The chamber in front of the dam 20 is, as will be seen, the chamber in which the major portion of the charge is reacted. A dam 21 is also provided at the output end of the drum 15. A water inlet 18 comprising three separate open-ended pipes is employed to introduce water into the drum 15. In the case of the preferred embodiment shown, the water inlet is connected by means of the pipe 66 as will be explained, to a source of lime hydrate sludge, the water content of which is used for the reaction. The water may be introduced above or below the level of the carbide feed screw 11. It is of advantage to locate the discharge of the carbide feed screw below the level of the carbide-lime hydrate-water mixture in this first chamber. A thermometer 19 is provided to take the temperature in the initial generating chamber of the drum 15.

Beneath the drum 15 are two further drums 30 and 40. The drum 30 is provided with a single shaft 31 on which are mounted agitator paddles 17 and the drum 40 with a shaft 41 on which are mounted agitator paddles 17. A passage 13 connects the input end of the drum 30 with the output end of the drum 15. The drum 30 is also provided with a dam 33 at its output end. The drum 30 is connected with the drum 40 by a passage 14.

At its output end, the drum 40 is connected to a horizontal screw device 44 leading to the bottom of a vertical screw 42. The screws 44 and 42 are adapted to remove hydrate from the drum 40 and also to provide a seal for preventing the escape of gas.

Scrubbing unit

From the generating device, the gas is taken to the scrubbing and cooling units for further treatment. The gas offtake 50 leads from the output end of the top of the drum 15. It is semi-circular in shape and preferably fitted with scrapers which keep the inner wall free from deposited lime hydrate. The gas offtake 50 enters a spray tower 60 adapted for the removal from the gas of the entrained lime hydrate. From the top of the tower 60 the gas passes through a passage 68 to the bottom of the cooling tower 70, and after cooling, out through an offtake 80. For feeding water and lime hydrate sludge as will be described, to the cooling and scrubbing towers, the following arrangement is provided.

Fresh water is introduced into the cooling tower through sprays 78 from a suitable source of fresh water supply. Cold, recirculated cooling water is also introduced into the tower through sprays 77. By means of these cold sprays, the acetylene gas is cooled to the desired temperature and the steam therein condensed before the gas is discharged from the system through the outlet 80. The hot water is collected in the reservoir 72 at the base of the cooling tower and circulated through pipes 73, pump 74 and heat exchanger 75, in which the water is cooled down to the desired temperature. This cooled water then passes through the pipe 76 partly into the cooling tower 70 by way of the sprays 77 and partly into the scrubber 60 through the sprays 61.

The scrubber 60 has the purpose of removing the considerable quantity of lime hydrate dust that is entrained in the gas. To accomplish this, the gas is first passed counter-current to a spray of hot sludge entering the tower by the sprays 67 and consisting of a suspension of lime hydrate in hot water. Finally, the gas is scrubbed by cold, clear water entering the scrubber by the sprays 61 to remove the residual lime hydrate from the gas. The gas is only slightly cooled in this scrubber and very little steam condensed out of it, but all of the entrained lime hydrate is removed. The hot sludge is collected in the reservoir 62 at the foot of the tower and recirculated through the pump 63 and pipe 64, to the scrubber 60 by the pipe 65 and sprays 67. Part of the sludge may also be pumped through the pipe 66 to the water inlet 18 of the generator and used to slake carbide.

It should be noted that according to this refinement of the applicant's process, the only fresh water added to the system is to the sprays 78 of the cooling tower. The only water lost from the system is that used up in reacting with carbide to form acetylene and lime hydrate, and the small quantity carried out as moisture in the lime hydrate and in the gas. The water introduced by the sprays 78 replaces this water. The large excess of water over that required for complete reaction which is added to the carbide in the reaction chamber in order to ensure wet generating conditions, is evaporated off as steam by the heat of the reaction. This steam is subsequently condensed out of the gas, the water used to scrub the gas free of lime hydrate particles, and the resulting hot sludge returned to the generator to slake further carbide. By virtue of this cyclic system there is no discharge of water or sludge to a sewer or sump, and therefore absolutely no loss of acetylene or lime hydrate. This is a great advantage over other dry generation processes now in use, where the loss of these materials in discharged scrubbing and cooling liquors may be considerable, and the acetylene dissolved therein may lead to explosions in sewers and the like. By using hot sludge from this cyclic system in place of cold water for slaking the carbide, a large excess of water may be used in this reaction with definite beneficial effects.

Provision is also made to discharge hot sludge to a suitable sludge pond (not shown on the drawing) by the pipe 66 and to introduce fresh, cold water to the generator by the inlet 18, if this method of operation should be desired.

OPERATING PROCEDURE

Generation of gas

In carrying out the process, calcium carbide of any size varying preferably from pea to dust is placed in the hopper 10. It is fed continuously through the valve 12 and by means of the variable speed screw feed 11 into the first chamber of the drum 15. According to the apparatus shown, water or hydrate sludge is fed into the drum by way of the inlet 18. The water or sludge may be hot or cold. In the embodiment shown, the sludge is pumped into the generator at the temperature of about 185° F. The lower limit to the amount of water charged into the process in relation to the carbide is determined entirely by the amount of carbide, that is sufficient water must be added to react the carbide completely and to absorb the heat of reaction. The upper limit to the amount of water charged into the process in relation to the carbide will be determined by the water content which is desired in the hydrate discharged taking into consideration as well the amount of water which is evaporated as steam, during the reaction. This will, of course, depend on the use to which the hydrate is to be put. Under some conditions it may be desirable for the hydrate to be discharged substantially dry (that is with a water content of less than 3%). In other cases, it may be desirable for the hydrate to contain considerable water (that is to say 20%). In any event, the amount of water charged at the starting point of the reaction is sufficiently low to keep the water content of the resulting hydrate below a predetermined maximum. Quantitatively, this amount will vary in different apparatus and under different conditions and with different grades of carbide. Usually the ratio of carbide to water is in the order of 1 to 2 parts by volume.

The first section formed between the inlet and the dam 20 is the actual generating chamber. The carbide is fed continuously while the water (or in the case of the preferred arrangement shown, the hydrate sludge) required for the generation is introduced by means of the three openings on the inlet 18.

The agitator paddles 17 are operated to give a very thorough mixing action. These paddles are arranged on two parallel shafts in such a way that they are capable of operating under a heavy load. Thus they can handle the heavy sticky mass that results if too great an excess of water is inadvertently added to the carbide. This is an advantage over other types of dry generators at present in use, where such a condition may lead to stalling of the agitators and drives, necessitating shutting down, purging and cooling the generator and cleaning it out manually, an operation that requires considerable time and labour. With the described design, the possible operating range of the generator is considerably widened.

Carbide, lime hydrate and water is very thoroughly mixed by agitation in the top drum. The action is similar to that of a pug mill. Most of the carbide is slaked in the first compartment, the balance usually being entirely slacked in the second compartment. Ocassionally, at high rates of feed on large-sized carbide, a small portion will go through to the second or third drum. Here, further water may be added if necessary by means of sprays. Besides permitting the slaking of residual carbide, the two bottom drums 30 and 40 also act as conditioning chambers to ensure even moisture distribution throughout the mass of lime hydrate. A surprising result is that the mass in the first chamber passes to a substantially dry stage in the subsequent chambers, without passing through a lengthy stage in which it has a putty-like consistency which one would expect to stall or break even the most powerful drive.

It is believed that this result is brought about by the rapid generation of gas in the water mixture and carbide in the first chamber. This very rapid generation of gas makes the wet hydrate extremely porous and light and prevents it from packing into a putty-like mass which is the bane of all foremen operating a dry generator.

From the bottom drum the lime hydrate is removed by means of the screws 44 and 42. The latter elevates the hydrate about 5 feet and discharges it into a suitable drag conveyor. The arrangement of these two screws permits the continuous discharge of lime hydrate from the machine without allowing any acetylene gas to escape. The screws are so designed as to provide a gas-tight seal of lime hydrate under all conditions.

The dams 20, 21 and 33 serve to maintain a fairly constant level of materials in the drums and also prolong the time that the material remains in them. This improves the mixing action and slaking. By adding to the carbide in the first chamber, all the water required for the generation, the mass is thoroughly wetted and over-heating is avoided. Some classification of the material occurs so that heavy pieces of unreacted carbide are held back until they are fully slaked. In this way, complete slaking of the carbide is ensured even with large-sized carbide and high rates of feed, and a high production rate is made possible without danger of unreacted carbide remaining in the hydrate. The dam 20 forms a chamber at the feed end of the top drum, into which according to preferred operation all the water used in the generation is introduced, so that the mass in this chamber is thoroughly wetted and overheating avoided. This impedes the formation of undesirable gaseous impurities and permits the rapid and uniform slaking of the carbide. According to modified operation additions of water can be made subsequently to the first chamber. The dam 20 functions to prevent the mixing of the incoming carbide and water with the lime hydrate already present as a result of preceding reaction and recurrent rewetting and drying of the hydrate is avoided. This results in a maximum ratio of liquid water to total solids at any point in the machine incidental to which is an increase in the capacity of the apparatus. The dams 20 and 21 form in effect horizontal chambers vertically separated so that the flow between them is baffled. In the preferred form shown, the chamber formed between the dams 20 and 21 is longer than that between the dam 20 and the wall at the feed end of the dam 15. The partition 43 in the lower drum serves merely to regulate the level of the hydrate in this drum. When the level rises to the height of this device closing off the top section of the drum, the resulting increase of pressure in the entrapped gas is immediately shown on a manometer attached to the top of this drum. The acetylene gas formed by the slaking of the carbide is first in intimate contact with the excess water in the first chamber during and immediately after generation; it then passes up through the offtake 50.

While the applicants have found it preferable to add most, if not all, the water to the generator through the intake 18 of the first chamber, particularly when the water contains hydrate sludge from scrubbing the gas, water may, for some conditions, also be added at later stages. To this end, sprays or other inlets can be placed at subsequent locations in the generating chambers.

*Scrubbing—Hydrate sludge circulation*

The acetylene gas is carried off through the offtake 50, as the reaction proceeds. This gas is in intimate contact with the excess of water in the first chamber during and immediately after generation. This gas contains a great deal of steam and some lime hydrate particles. These impurities are carried along by the gas stream, which enters the offtake 50 and is carried into the scrubbing tower 60. In this tower the gas is first sprayed with a slurry of lime hydrate pumped from sprays 67 and then with clear water admitted by the sprays 61. The slurry is obtained from the reservoir 62 at the bottom of the tower and is recirculated through this tower. Part of the slurry is also drawn off continuously to be used elsewhere in the system, e. g., in the generating chambers, so that the content of lime hydrate in it does not usually rise above 10% by weight. The reservoir 62 is maintained at a constant level by an automatic regulator which operates a control valve in the water line to the sprays 61, opening or closing the valve to admit more or less water as the level in the reservoir falls or rises.

Under preferred operating conditions, the gas leaves the top of the tower at a temperature of about 200° F. and enters the bottom of the cooling tower 70 at about 195° F. In this tower it is cooled to about 85°–90° F. by spraying it with cold water. The major portion of this cooling water is admitted by the sprays 77, these receiving their supply from the reservoir 72 at the foot of the tower. The heat exchanger 75 lowers the temperature of this cooling water from about 120° F. to 60° F. By circulating this cooling water and re-using it, the high loss of acetylene is avoided that would result if this water, saturated with acetylene to the extent of volume for volume, were simply to be discharged to the sewer after being used only once. A small part of this circulating water is also bled off to the sprays 61 to maintain the level of the slurry in the reservoir of the first tower 60. The contents of the reservoir at the foot of the cooling tower are maintained at a constant level by means of an automatic regulator, which controls the amount of fresh water entering by the sprays 78 at the top of the tower. These sprays have a threefold purpose, to cool the gas further, to maintain the level of the water in the reservoir 72 and to supply all the fresh water introduced into the system.

The gas leaving the top of the cooling tower by the outlet 80 is now free of lime hydrate and cooled to room temperature. It is thus ready for most uses. For others, it may require further scrubbing to remove certain gaseous impurities always associated with acetylene, such as hydrogen sulphide, ammonia, phosphine and organic sulphur compounds in small quantities.

With the described type of generator, acetylene gas has been produced containing only 1–2 grams of organic sulphur per 1,000 cu. ft. although the carbide contained over 1% of sulphur. The usual type of wet generator produces gas containing about 1 gram of organic sulphur per 1,000 cu. ft. while some dry generators introduce 10 to 50 grams organic sulphur per 1,000 cu. ft. into the gas, using carbide of this sulphur content. It was surprising to the applicants to discover that the process herein described generated an acetylene gas so low in organic sulphur even when using a carbide high in sulphur content.

The re-circulation procedure described above may be considered as constituting three separate systems, namely, (1) a generating system, (2) a scrubbing system and (3) a cooling system. The generating system is a cycle comprising the addition of liquid to the generator in excess of the requirements of the chemical reaction, the evaporation of this excess, its condensation and eventual return to the generating process. The scrubbing system includes a cycle wherein water containing a hydrate sludge is sprayed into the gas stream wherein it collects further hydrate and is then re-circulated, part being bled off to the generating system. The cooling system includes a cycle into which cool water is sprayed into the gas stream, subsequently collected, cooled and returned to complete the cycle, a part being bled off and fed to the scrubbing system. The entire fresh water supply is added to the cooling system and the carbide supplied to the generating system. Through this procedure the loss of starting materials and reaction products is reduced substantially to a minimum.

Examples

To give more detailed interpretation of operating conditions, the results of a series of actual runs on a specific generating apparatus of the type described will now be offered by way of examples.

The following runs were carried out in an apparatus in which the drum 15 was approximately 9 ft. long by 5 ft. wide by 3½ ft. deep. The size of the generating chamber formed by the first dam 20 was approximately 1¾ ft. long, 5 ft. wide and 2½ ft. deep. The conditions of operation and the results of the runs are as follows:

Conditions

|  | Run 1 | Run 2 | Run 3 |
|---|---|---|---|
| TIME AND QUANTITY FACTORS | | | |
| Duration of run……hours.. | 24 | 23.75 | 24 |
| Total carbide used…pounds.. | 298,000 | 246,000 | 234,000 |
| Limits of carbide feed rate pounds per hour.. | 10,000–14,000 | 8,500–12,500 | 8,000–12,000 |
| Lime hydrate slurry used containing 10% hydrate pounds.. | 410,000 | 339,000 | 317,000 |
| Approx. water content..do…. | 370,000 | 307,000 | 292,000 |
| Average carbide feed rate pounds per hour.. | 12,400 | 10,350 | 9,750 |
| Average rate of sludge feed pounds per hour.. | 17,100 | 14,300 | 13,200 |
| TEMPERATURES | | | |
| Gas at offtake on top drum °F.. | 206–224 Av. 211 | 205–211 Av. 206 | 205–212 Av. 206 |
| Between top and middle drums …………… °F.. | 207–212 Av. 209 | 206–210 Av. 206 | 206–212 Av. 206 |
| Between bottom and middle drums………… °F | 202–210 Av. 206 | 202–208 Av. 204 | 196–204 Av. 202 |
| Mixture of carbide and lime hydrate at feed end of top drum………………………… | 204–262 Av. 223 | 212–265 Av. 230 | 210–270 Av. 230 |
| RESULTS | | | |
| Total lime hydrate made pounds.. | 346,000 | 295,000 | 277,000 |
| Average rate of hydrate production..pounds per hour.. | 14,400 | 12,400 | 11,550 |
| Moisture content of lime hydrate……… per cent | 1.0 / 3.0 | 8.0 / 9.0 / 2.0 | 6.4 / 4.0 / 3.0 |
| Organic sulphur content of gas (grams sulphur per 1,000 cubic feet gas)…… | 3–4 | 1–2 | 2–3 |
| Sulphur content of carbide per cent | 1.0 | 0.7 | 0.8 |

Advantages

Many advantages accrue from the above described generation process. One advantage is that all the slaking of the carbide can be done with a slurry of lime hydrate instead of fresh water. This slurry is pumped from the bottom of the hydrate removal tower 60 by means of the pump 63 into the drum 15 through the inlet pipes 18. By using this slurry instead of fresh water, a cyclic system is possible in which the gas is cleaned and cooled with absolutely no loss of acetylene or hydrate. All the water used to remove entrained lime hydrate from the gas is recovered and reused both to slake additional carbide and to be recirculated through the hydrate removal tower; the water required for cooling the gas is also cooled and recirculated.

In other dry generation systems where the water used for scrubbing and cooling is discarded and fresh water used for slaking the carbide, the loss of acetylene and lime hydrate in the water which is thrown away may be considerable. At the same time, the acetylene liberated in the sewers from this waste water or sludge presents an explosion hazard. In the present system, the only fresh water added is that admitted to the top of the cooling tower by the sprays 78. This water is equivalent to that used in the chemical reaction with the carbide plus the small amount carried out of the system as moisture in the hydrate and in the gas.

The large excess of water added to the first generating chamber for the purpose of absorbing the heat of reaction appears as steam in the gas and is recovered by condensation of the steam in the cooling tower. In slaking of carbide, the heat generated amounts to almost 800 B. t. u's. per pound of carbide. This heat must be dissipated by adding an excess of water which is evaporated off as steam. If the water supply is insufficient, the temperature of the mass of lime hydrate and carbide and also of the gas will rise, and this higher temperature leads to the formation of undesirable organic sulphur compounds such as divinyl sulphide.

For this reason it is advantageous to carry out the slaking of the carbide in the presence of a definite excess of water while still recovering substantially dry lime hydrate having a desired moisture content. Thus it is also of advantage to introduce all of the water at the same zone as the carbide is admitted to the generator to use as large an excess of water as is consistent with smooth operation, immediate thorough mixing of the reactants and the production of lime hydrate of the desired moisture content. The preferred design of generator shown is particularly well adapted to achieve these purposes. The dam at the feed end of the top drum permits the entering liquid water to be retained within a confined space, thus keeping the entire mass thoroughly wetted at all times. The two agitator shafts with specially designed paddles provide thorough mixing even when the mass is very wet and therefore heavy and sticky.

It is also important to note that the operation of the process is substantially independent of certain variables in the carbide. For instance, different carbides have different slaking speeds and as a result are difficult to handle in some generating processes. Furthermore, it is difficult to eliminate fines from carbide, but since there is no lower limit to the size of the carbide that can be handled in the present process, this is no handicap.

Furthermore, by using hot sludge at a temperature of about 185° F. for slaking, it has been found possible to add a larger quantity of water in proportion to the carbide than is possible when using cold water of say 60° F.

The explanation is that by using preheated sludge less heat is required to heat the water to the point of volatilization, this heat being made available instead for the volatilization of further water. For one ton of carbide this difference in heat required to heat up the water to the volatilization point is about 274,000 B. t. u. Instead of allowing this free heat to increase the temperature of the reacting mass, further hot water is introduced into the reaction chamber to absorb this heat. It is found that in this way a further 272 lbs. of water per ton of carbide may be added to the reaction chamber and completely volatilized as steam, no increase in the moisture content of the hydrate produced taking place. This represents an increase of over 12% above the amount of water that can be added to the ordinary dry generator using cold water. If this extra 12% of water were introduced into a generator of this type, the moisture content of the lime hydrate would be raised from 3% to almost 15%, under which conditions the generator could not operate. In the present invention all of this excess water which is added as hot sludge is evaporated off as steam without affecting the moisture content of the discharged lime hydrate, the additional water also assisting in maintaining wet generating conditions and in reducing the temperature within the generator.

*Control features*

Temperature control is an essential factor in the operation of the generator. Thermometers are thus provided at strategic points throughout the apparatus. Manometers are also provided to indicate the gas pressures at various points in the system.

Ammeters indicate the loads on the motor on each of the three agitators. By observing the conditions indicated by the thermometers and ammeters, the operation of the machine can be readily controlled.

If the temperatures rise above normal, this indicates an insufficiency of water; if the amperage is higher than normal, this indicates that the hydrate has become too wet, i. e., that too much water is being added. The feed rate of the sludge or water to the generator is indicated by a rotameter.

The carbide feed screw is calibrated to indicate the weight of carbide fed for a given speed of rotation. The operation of the scrubbing and cooling towers 60 and 70 is controlled by means of automatic level regulators, which maintain the level of the liquor in the reservoirs at the base of these towers by opening or closing valves in the feed lines to the sprays to admit more or less water as the level falls or rises. The rate of discharge of lime hydrate from the generator is controlled by a variable speed drive on the horizontal hydrate screw 44. Safety pressure releases not shown on the drawing, are provided to prevent the building up of dangerous pressures inside the generator.

Other advantages will also become apparent to those skilled in the art.

The invention has been described specifically as applied to the production of acetylene and lime hydrate by the reaction of calcium carbide and water because this is thought to be its most practical application at the present time. It is not, however, confined to these particular materials, but extends to other reactions of a solid with a liquid to produce a gas and a substantially dry residue, as will be understood by those skilled in the art.

It will, therefore, be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A process of producing acetylene and lime hydrate by the reaction of calcium carbide and water, comprising, continuously feeding a total charge of calcium carbide and liquid together into a generating chamber in which these materials are mixed together immediately to cause rapid inter-action to generate acetylene and to form a substantially uniform wet mass of liquid calcium carbide and lime hydrate causing said wet mass to build up to a predetermined level whereby successive portions of the charge are prevented from leaving immediately the addition points and, continuously removing successive portions of the mixture to another chamber away from contact with the incoming charge without further addition of carbide or liquid, agitating the removed portions to react the remaining carbide and to dry the hydrate, regulating the feed of the liquid and carbide to control the moisture content of the hydrate produced to within predetermined limits, the amount of liquid fed into said generating chamber being effective to react the carbide completely and to absorb the heat of reaction and continuously discharging gas and lime hydrate from the process.

2. A process, comprising, the steps of feeding into immediate contact at proximate points in a generating zone, calcium carbide and liquid whereby a zone is formed in which the liquid is in considerable excess of the carbide, agitating the contents of the zone to generate acetylene and to form a substantially uniform mixture of liquid and solids causing said mixture to accumulate to a substantial depth adjacent the addition points while, progressively removing succeeding portions of the mixture from the zone away from the incoming charge without further addition thereto of carbide or liquid, agitating the succeeding portions to complete the reaction, regulating the feed of carbide and liquid whereby the moisture content of the hydrate at the completion of the reaction is within predetermined limits, the amount of liquid fed being effective to react the carbide completely and to absorb the heat of reaction, and continuously discharging acetylene and lime hydrate from the process.

3. A process for the simultaneous production of acetylene and dry lime hydrate, comprising, adding calcium carbide and water to a reacting zone of limited extent, the amount of water added being effective to react the carbide completely to absorb the heat of reaction and to control the water content of the hydrate within predetermined limits, agitating the charge whereby it is moved in a horizontal path, subjecting the agitated charge to the action of an upstanding baffle in its path at a location spaced apart from the addition points of the charge wherein an accumulation of the charged mixture is created in the locality of the addition points, partly reacted portions of said charged mixture escaping the baffle to a further zone whereby they are removed from contact with incoming portions of the charge, the accumulation in the first zone thereby containing a considerable excess of water, the second zone containing less water to total solids to form a drier charge which is agitated to complete the reaction with the carbide, the amount of water in each zone being substantially that required for a predetermined moisture content in the hydrate produced.

4. A process for the simultaneous production of acetylene and dry lime hydrate, comprising, continuously forming a charge of calcium carbide and water, the amount of water being effective to react the carbide completely to absorb the heat of reaction and to control the water content of the hydrate to within predetermined limits, mixing together the calcium carbide and water whereby the reaction is encouraged, the water and carbide being added simultaneously in one limited zone whereby the water is initially in considerable excess of the total solids retarding the flow of the mixture of carbide and water whereby a wet mixture of the charge and reaction products builds up to a considerable depth adjacent the addition points while, progressively moving the mixture away from said zone whereby partially reacted portions of the mixture are separated from more recently added portions of the charge.

5. A process for the simultaneous production of acetylene and dry lime hydrate, comprising, simultaneously adding together calcium carbide and water in a reacting zone of limited extent, the amount of water added being effective to react the carbide completely to absorb the heat of reaction and to control the water content of the mixture, agitating the contents of the zone to hasten the reaction and to move them away from the point of addition causing the charge to accumulate to a considerable depth as a wet mass adjacent the addition points while, progressively removing portions of the additions to a subsequent zone whereby mixture of the products added and those partially reacted is prevented, continuing to agitate the removed products to complete the reaction, said removal being effective to create stages of treatment of relatively decreasing water content.

6. A process for reacting a solid and a liquid whereby a gas and a substantially dry residue are produced, comprising, introducing said solid into a reaction chamber, introducing controlled amounts of said liquid into said chamber so as to contact said solid and produce said gas, the major portion of said liquid being introduced adjacent to one end of said reaction chamber, accumulating in said chamber a wet mixture comprising said solid, liquid and residue, agitating said mixture to cause movement in a horizontal direction of said solid away from said point of feeding said liquid, baffling the flow of the mixture to cause an accumulation adjacent the feeding points, allowing portions of the mixture to proceed whereby they are prevented from further immediate contact with the added liquid and solid, and agitating the portion of said mixture which has left the chamber in order to react the remaining solid with the liquid.

7. A process as claimed in claim 6 wherein the path is horizontal and baffled by dams into a series of reaction zones, the contents of each zone being caused by the agitation of the charge to flow over the dams into subsequent zones of decreasing water content, the ratio of liquid to solid in each zone being at a maximum, the ratio of liquid to solids in the succeeding zones being markedly less.

8. A process for the production of acetylene and lime hydrate wherein a charge of calcium carbide and water is continuously moved in a horizontal path through a generating zone in which acetylene is generated the carbide is reacted completely and the hydrate is dried, comprising, feeding all the water and carbide adjacent the beginning of the path, placing a dam in said path whereby an accumulation of the charge is formed adjacent the charging points, agitating the charge whereby the constituents of the charge are mixed together to generate acetylene and to form a wet mass of the solids and water, continuously causing successive portions of the mixture to pass the dam away from contact with the incoming charge, agitating the successive portions to react the carbide completely and to dry the hydrate and discharging gas and lime hydrate.

9. A process for the production of acetylene and lime hydrate wherein a charge of calcium carbide and water is continuously moved in a horizontal path through a generating zone in which acetylene is generated and the carbide is reacted completely and the hydrate is dried, comprising, feeding all the water and carbide adjacent the beginning of the path, placing a plurality of dams in said path whereby respective accumulations of the charge are formed, said accumulations being of progressively decreasing water content, agitating the charge whereby the constituents thereof are mixed together to generate acetylene and to form a uniform mixture of the solids and water, continuously causing successive portions of the mixture to pass from one zone to the next, and discharging gas and lime hydrate.

10. A process for producing gas and a dry residue by the reaction of a solid and a liquid, comprising, feeding the solid and the liquid into a reaction zone, reacting a major portion of the solid and liquid by causing the charge to build up adjacent points whereby the water is in such an excess of total solids that a rapid reaction of the major portion of the solid is effected, continuously and progressively passing successive portions of the mixture to a separate zone wherein the ratio of liquid to total solids is less than that of the first zone, completing the reaction in said separated zone, the ratio of liquid to solid in both zones being sufficient to react the solid completely to absorb the heat of reaction and to control the water content of the solid residue discharged to within predetermined limits, agitating the charge in each zone effectively to create a substantially uniform mixture of liquid and solids.

11. A process for the simultaneous manufacture of a gas and a substantially dry residue by reaction of a solid and a liquid, comprising, continuously feeding together into immediate contact in a horizontal reacting zone calcium carbide and a controlled excess of water, causing the contents of said zone to accumulate to a substantial predetermined depth adjacent the addition points whereby the liquid is in such an excess of the solids that a rapid reaction of the major portion of the solids takes place rapidly, continuously agitating the contents of the zone whereby said contents are mixed into a substantially uniform wet mixture of lime hydrate water and unreacted carbide, continuously removing said mixture containing lime hydrate unreacted carbide and water from the zone to maintain the said depth within predetermined limits treating the products so removed to react the carbide completely and to produce substantially dry lime hydrate and acetylene, regulating the amount of water and carbide fed to control within predetermined limits the amount of water in the hydrate discharged from the process, and continuously removing the generated gas from said reaction.

12. An apparatus for the reaction of a liquid and a solid with the incidental generation of gas, comprising, an elongated horizontal reaction chamber wherein the liquid and the solid are fed for interaction, said chamber having a feed end and a discharge end, means adjacent the feed end for charging solid into the chamber, means at the feed end for charging liquid into the chamber, a dam in the chamber spaced from said feed end for baffling the flow of material through the chamber, means for agitating the contents of the chamber to cause movement thereof away from the point of feed, means for discharging gas from the chamber, and means for discharging reacted solid from the chamber.

13. An apparatus for the reaction of a liquid and a solid with the incidental generation of gas, comprising, a reaction zone, means adjacent one end of said zone for feeding the solid, means adjacent the same end of said zone for feeding the liquid whereby they are mixed together and moved away from the locality of feeding, means spaced from the feeding means for baffling the flow of the mixed solid and liquid whereby the mixture assumes a certain depth and is delayed from mixing with the material beyond said baffling means.

14. An apparatus for the reaction of a liquid and a solid with the incidental generation of gas, comprising, an enclosure through which the charge is moved in a horizontal path, means for feeding liquid and solid to one end of said enclosure, a plurality of spaced apart dams arranged periodically along the length of said enclosure whereby the flow of the contents of the enclosure is baffled vertically so as to assume a predetermined depth, means for agitating the contents of said enclosure whereby they are moved away from said feeding points, means for discharging the reacted solid from said enclosure and means for discharging gas from said enclosure.

15. An apparatus for the reaction of a liquid and a solid to produce a gas and a solid residue, comprising, a reaction chamber through which the charge is moved in a substantially horizontal direction, means for feeding the solid to said chamber adjacent the beginning of the path, means for feeding liquid to said chamber adjacent the beginning of the path, a dam in said chamber for causing the charge to assume a predetermined depth, a shaft extending through said chamber in the direction of movement of said charge, agitating members on said shaft adapted to agitate the charge transversely to the direction of its movement, said agitating members also being adapted to cause said movement of the charge in the horizontal direction, means for discharging the solid residue and means for discharging the gas.

16. An apparatus for the reaction of a liquid and a solid to produce a gas and a solid residue, comprising, an enclosure forming a passage through which the charge is moved in a horizontal direction, a plurality of spaced apart dams in said passage adapted to dam the charge to a predetermined depth, means for agitating and moving said charge through said passage, said feeding and agitating means being effective to cause said charge to overflow said dams, and means for discharging solid residue, and means for discharging gas.

17. A process of producing a gas and a solid residue by the reaction of a liquid and a solid wherein the charge is fed into a reaction chamber and advanced through a horizontal path while being agitated to encourage reaction, the step of, imposing vertical baffles in said path whereby the charge is accumulated periodically to a predetermined depth, and discharging the gas and the solid residue.

18. A process of producing a gas and a solid residue by the exothermic reaction between a liquid and a solid, comprising, continuously and simultaneously carrying on; a generating step wherein the solid and the liquid are fed together in a reaction zone to generate the gas and to produce a substantially dry solid residue, and there is discharged a gaseous mixture including the reaction gas liquid vapour and entrained finely divided solid, and the solid residue is discharged separately; a scrubbing step in which the gaseous mixture is scrubbed with liquid to remove therefrom entrained solid, the scrubbing liquid is collected and fed part to the scrubbing step and part to the generating step, and the scrubbed gas is discharged; and a cooling step wherein the scrubbed gas is treated by contact with relatively cool liquid to cool the gas and to condense entrained vapour, the cooling liquid and entrained substances are contacted with liquid, cooled and fed part to the cooling step and part to the scrubbing step and the cooled gas discharged; and the fresh liquid is added to the cooling step to replenish the liquid consumed by the generating step.

19. A process of producing a gas and a solid residue by the exothermic reaction between a liquid and a solid, comprising, continuously and simultaneously carrying on; a generating step wherein the solid and the liquid are fed together in a reaction zone to generate the gas and to produce a substantially dry solid residue, and there is discharged a gaseous mixture including the reaction gas liquid vapour and entrained finely divided solid, and the solid residue is discharged separately; a treating step including treating the gaseous mixture with a liquid to remove therefrom entrained solid and to condense entrained vapour, and including cooling the treating liquid and entrained material and feeding it both to the treating and generating steps discharging the cooled gas, and adding to the treating step substantially all the fresh water required to sustain the process.

20. A process of producing a gas and a solid residue by the exothermic reaction between a liquid and a solid, comprising, continuously and simultaneously carrying on; a generating step wherein the solid and the liquid are fed together in a reaction zone to generate the gas and to produce a substantially dry solid residue, and there is discharged a gaseous mixture including the reaction gas liquid vapour and entrained finely divided solid, and the solid residue is discharged separately; a treating step including contacting said gaseous mixture with a liquid to remove therefrom undesired entrained solids and vapours, collecting from the treating step a sludge of liquid and entrained solid, feeding said sludge to the generating step in an amount sufficient to carry out the reaction and to absorb the heat thereof to produce hydrate of predetermined moisture content, feeding the remainder of the sludge to the treating step, and adding fresh liquid to the treating step to replenish the liquid used in the reaction.

21. A process of producing acetylene and substantially dry lime hydrate by the reaction of calcium carbide and water, comprising, continuously and simultaneously carrying out a generating step wherein the calcium carbide and the water are fed together in a generating zone to generate acetylene and to produce substantially dry lime hydrate and there is discharged a gaseous mixture including acetylene water vapour entrained finely divided hydrate and the substantially dry lime hydrate is discharged separately, a treating step including contacting said gaseous mixture with water to condense vapour and entrained hydrate to form a sludge, discharging the treated acetylene, recirculating said sludge to the generating step in amounts effective to react with the carbide fed and to absorb the heat of reaction, feeding the remainder of the sludge to the treating step, feeding in addition to the treating step amounts of water effective to replenish the water used up in the reaction.

22. A process of producing acetylene and substantially dry lime hydrate by the reaction of calcium carbide and water, comprising, continuously and simultaneously carrying out a generating step wherein the calcium carbide and the water are fed together in a generating zone to generate acetylene and to produce substantially dry lime hydrate and there is discharged a gaseous mixture including acetylene water vapour entrained finely divided hydrate and the substantially dry lime hydrate is discharged separately, treating said gaseous mixture with an aqueous substance to remove therefrom entrained hydrate and to cool the gas, discharging the gas, passing all the aqueous and entrained substances resulting from said treatment part to the generating step and part to the treating step whereby substantially all the solids carried out with the gaseous mixture and the acetylene dissolved in water are retained in the process, adding to the treating step the additional water required to replenish that used up in the reaction.

23. An apparatus for the exothermic reaction of a liquid and a solid with incidental generation of a gas, comprising, an enclosed system including; a generating unit in which the reaction is carried out, a liquid inlet to said generating unit, means for feeding solid to said generating unit, a gas outlet from said generating unit, means for discharging solid from said generating unit; a scrubbing unit for receiving the generated gas from said gas outlet, liquid inlets to said scrubbing unit for aqueous sludge, means for collecting sludge from the scrubbing unit following contact with the gas; a gas cooling unit, liquid inlets in said gas cooling unit, a liquid feed to the inlets in said cooling unit, liquid cooling means connected to said gas cooling unit, means for collecting cooling liquid after contacting the gas; connections for conveying the collected liquid through the cooling means to inlets in said cooling unit and to inlets in said scrubbing unit, connections for conveying the sludge collected from said scrubbing apparatus part to said liquid inlets in the scrubbing apparatus and part to the liquid inlet to said generating apparatus, gas communications for conveying scrubbed gas from said scrubbing unit to said cooling unit, and means for discharging cooled gas from said cooling unit.

ANDREW CLIFFORD HOLM.
EDDIE POIRIER.